United States Patent [19]

Kasai et al.

[11] Patent Number: 4,682,385
[45] Date of Patent: Jul. 28, 1987

[54] METHOD AND APPARATUS FOR AUTOMATICALLY SUSPENDING SAUSAGES FROM A BAR

[75] Inventors: Minoru Kasai, Kanagawa; Takao Oka; Munenori Takamagari, both of Hiroshima; Chiyoji Shibata, Kanagawa; Minoru Nakamura, Tokyo, all of Japan

[73] Assignees: Fukutome Meat Packers, Ltd., Hiroshima; Hitec Co., Ltd., Tokyo, both of Japan

[21] Appl. No.: 791,348

[22] Filed: Oct. 25, 1985

[30] Foreign Application Priority Data

Oct. 25, 1984 [JP] Japan .......................... 59-161936[U]
May 30, 1985 [JP] Japan ................................ 60-117423

[51] Int. Cl.[4] ............................................. A22C 15/00
[52] U.S. Cl. ............................................. 17/45; 17/1 F
[58] Field of Search .............. 226/104, 105, 106, 107, 226/119; 17/1 R, 1 F, 44.4, 45

[56] References Cited

U.S. PATENT DOCUMENTS

| 3,115,668 | 12/1963 | Townsend | 17/33 |
| 3,204,844 | 9/1965 | Wallace | 226/104 |
| 3,430,831 | 3/1969 | Burton et al. | 226/105 |
| 4,091,505 | 5/1978 | Müller et al. | 17/1 F |
| 4,233,709 | 11/1980 | Smith et al. | 17/1 F |
| 4,547,931 | 10/1985 | Staudenrausch et al. | 17/1 F |

*Primary Examiner*—Willie G. Abercrombie
*Attorney, Agent, or Firm*—Rosen, Dainow & Jacobs

[57] ABSTRACT

A chain of linked sausages is suspended from a bar in equally spaced loops by continuously discharging the chain of linked sausages while the chain is formed into into loops, suspending the loops of sausages directly from the bar a rearward end of which is situated inside the loops as they are formed, and successively moving each loop suspended from the bar toward a forward end of the bar while a uniform loop spacing is maintained.

21 Claims, 11 Drawing Figures

METHOD AND APPARATUS FOR AUTOMATICALLY SUSPENDING SAUSAGES FROM A BAR

BACKGROUND OF THE INVENTION

1. Field of the Invention:

This invention relates to the manufacture of sausages and, more particularly, to a method and apparatus for suspending a chain of sausages, which have been twisted into links, from a bar by looping the sausage chain over the bar before the sausages are subjected to a heat treatment.

2. Description of the Prior Art:

A chain of sausages twisted into individual but interconnected links is delivered to a heat treating process upon first being suspended in loops from a bar. In order to obtain a high quality product by assuring that the sausages are heated uniformly during the heat treatment, it is required that the suspended loops of sausage be equally spaced and of the same length.

Though apparatus for forming sausages into loops are well-known in the art, all of them involve difficulties in suspending the sausage loops from the bar in an equally spaced manner. One example of such an apparatus is disclosed in the specification of Japanese Patent Publication No. 40-27509. Since the apparatus includes a smoking bar on which a sausage chain is hung directly, replacing one hanging chain for another involves less labor in comparison with the other known examples of the prior art, described below. However, since the rear portion of the smoking bar is merely inserted into a hole formed in a disk of a link looper and hangs down at an incline, the sausages are not suspended from the bar in loops that are equally spaced. This makes it necessary to detach the bar from the apparatus and space the loops equally by hand. This is a very time-consuming operation.

A second example of the prior-art apparatus is disclosed in the specification of Japanese Patent Publication No. 41-5899. The apparatus includes a conveyor chain provided with equally spaced hooks and arranged to pass near the vicinity of a conveyor pipe of a looper from which sausages in linked form are discharged. With this arrangement, each loop of sausages is suspended from one of the equally spaced hooks. In order for the sausages to be delivered to the heat treating process, the sausages must be transferred to a bar while the equal spacing between the loops is maintained. This not only necessitates the labor involved in transferring the sausages but also requires the greatest care to assure that the sausages are not damaged by the bar during the transfer. Moreover, there are occasions where the equal loop spacing is lost in making the transfer to the bar, thus requiring that the spacing be readjusted by hand.

A third example of the prior art is described in the specification of Japanese Patent Publication No. 59-50294. Here sausages are successively delivered while suspended in loops from a rotary guide shaft having a screw-like groove on its outer periphery. Though the sausage loops are suspended from the guide shaft in equally spaced form, the apparatus has the same drawbacks as that of the second example described above in that the sausages must be transferred to a bar.

Thus, in the second and third examples of the prior art, the sausages are not hung directly from the bar. In consequence, the sausage chain formed into equally spaced loops must be rehung from the bar in such a manner that the loop spacing is maintained. In the first example, on the other hand, the sausage loops are hung directly from the bar but the loops are not evenly spaced. This makes it necessary to space the loops equally by hand. These drawbacks of the prior art result in low operating efficiency.

SUMMARY OF THE INVENTION

An object of the present invention is to provide a method and apparatus for suspending sausages from a bar without encountering the difficulties of the prior art.

Another object of the present invention is to provide a method and apparatus for suspending sausages from a bar automatically, whereby sausages are directly suspended from a bar in equally spaced loops and subjected to heat treatment following removal of the bar from the apparatus.

According to one aspect of the present invention, the foregoing objects are attained by providing a method of suspending a chain of linked sausages from a bar in loops, comprising the steps of continuously discharging the chain of linked sausages while forming the chain into loops, suspending the loops of sausages directly from the bar the rearward end of which is situated inside the loops, and successively moving each loop suspended from the bar toward a forward end of the bar while maintaining an equal spacing between mutually adjacent ones of the loops.

An apparatus for practicing the method of the present invention comprises loop forming means having an inlet port at one end thereof for receiving the chain of linked sausages from sausage supply means, and a discharge port at another end thereof for discharging the sausages while it is being revolved around a rearward portion of the bar to form the chain of sausages into loops, whereby the chain of sausages is suspended in loops from the rearward portion of the bar, bar supporting means for detachably supporting the bar and having a support portion for supporting the bar in such a manner that the rearward portion of the bar is disposed inside the loops into which the chain of sausages is formed, and transfer means for successively moving each loop suspended from the bar toward a forward portion of the bar while maintaining an equal spacing between mutually adjacent ones of the loops. The loop forming means is constituted by a guide body, which has the discharge port off-centered with respect to a central axis of the inlet port, and which is supported for rotation about the central axis of the inlet port.

The guide body of the loop forming means is not particularly limited as to configuration provided that the discharge port is disposed at the position off-center from the central axis of the inlet port. Examples of configurations that can be mentioned are a cylindrical body bent into an elbow-like shape, a frame consisting of frame members assembled into a shape similar to that of the cylindrical body, or a cylindrical body or frame having a circumferentially twisted configuration. In order to deliver the sausages from the supply means to the guide body smoothly, the inlet port of the guide body preferably is provided with a non-rotational introducing member penetrating the interior of the inlet port from the supply means side. Further, a stable loop forming operation can be achieved if a receptacle is disposed at a position underlying the discharge port and has a receiving surface facing the discharge port for receiving sausages.

The bar supporting means may be adapted to support the forward and rearward portions of the bar at first and second support portions, or solely the rearward portion of the bar in cantilever fashion. In another embodiment, the transfer means serves also as the bar supporting means. Where the cantilever-type supporting arrangement is adopted, an auxiliary conveyor supporting the loops from below and traveling at the same speed as the transfer means should be provided in order to lighten the load on the bar. In a case where the bar is supported by the transfer means, a stopper is necessary to prevent the bar from moving together with the transfer means. The first support portion for supporting the rearward portion of the bar may be provided on a part of the guide body at a position located on the rotational axis of the guide body, or may be provided separately of the guide body. It is also possible to rotate the bar if this is desirable in view of the surrounding mechanisms, or in order to assure that the sausages will always be suspended at the portions where the links are interconnected.

The transfer means is for transfering the loops suspended from the bar toward the forward portion of the bar while maintaining an equal spacing between the loops, and may itself be adapted to advance with the loops or to remain at rest. The advancing-type transfer means includes an endless traveling body having a transfer zone extending from the rearward portion toward the forward portion of the bar and spaced away from the bar. The endless traveling body has a plurality of equally spaced arms attached thereto for contacting the loops of sausages suspended from the bar. The endless traveling body is not particularly limited to one configuration and may comprise a chain, belt or rope, by way of example. Each or the arms attached to the endless traveling body is adapted to come between neighboring loops of sausage suspended from the bar. As the arms travel toward the forward portion of the bar, therefore, each arm engages one of the sausage loops so that the loops are advanced while maintained at an equal spacing. Accordingly, no particular problems are involved in selecting the positions at which the arms are attached to the endless traveling body since it will suffice if the arms are spaced equally where they come into contact with the loops. In order for the arms to advance the loops as described above, it will suffice if the arms are at positions where they can contact the loops. However, in order to obtain a more accurate equal loop spacing, the arms should contact the loops at the portions closest to the locations where the loops are suspended. To this end, the arms should be made to come into sliding contact with the bar or should be situated so close to the bar as to virtually contact it slidably. The arms may be round or prismatic rods. However, in order to bring the portion of contact between the loops and the arms as close as possible to the points at which the sausage loops are suspended, as described above, prismatic-type rods are preferred.

The endless traveling body circulates continuously so as to return the arms of the transfer means from the forward to the rearward end of the transfer zone. An arrangement should be adopted wherein the arms of the transfer means are separated by this circulating motion from the bar at the region where the abovementioned return is made so that sausages will not be damaged. One method of accomplishing this is to gradually move the arms away from the bar as the endless traveling body travels. Another method is to separate the arms from the bar in a rapid manner. To practice the former method, the endless traveling body to which the arms are attached is arranged so as to gradually part from the bar. The latter can be practiced by attaching the arms to the traveling body in such a manner that the arms are capable of swinging freely with respect to the traveling body or of being thrust toward and withdrawn from the bar. Then, by using a cam or the like, the arms can be made to pivot under their own weight or under the application of a force applied by a spring when they arrive at a predetermined position. The arms can also be made to recede from the bar by adopting a combination of a cam and springs.

An example of the stationary transfer means is a helical body which rotates about an axis spaced away from the bar. The radius of the helical body should at least be equal to the distance between the helical body and the suspended sausages to assure that the helical body will transfer each loop of the sausages toward the forward end of the bar as the helical body rotates. If the arrangement is such that the radius of the helical body gradually diminishes toward the forward end of the bar, the effect is similar to that obtained by moving the arms away from the bar in the above-described manner.

In order to suspend a loop of the sausages from the bar at each one of the arms, the speeds of the guide body and transfer means are adjusted in such a manner that the transfer means moves a distance equivalent to the spacing between arms while the guide body of the loop forming means makes one revolution. If it is desired to provide a wider spacing between loops of sausage, the speed of the transfer means is made an integral number of times larger than the rotating speed of the guide body. This will result in a loop spacing that is an integral number of times wider than the initial loop spacing.

The sausages are fed into the inlet port of the rotating guide body by the supply means, whereupon the sausages are discharged from the discharge port of the guide body while being formed into loops. Since each loop of sausages is formed about the rearward portion of the bar, the loop is suspended from the bar. Meanwhile, the transfer means engages each loop as it is formed and transfers the loops one after another toward the forward end of the bar while the loops are spaced apart uniformly. The lengths of the suspended loops will also be the same if the supply means is set to operate at a constant supply rate. Thus, the sausages are suspended from the bar in looped form and the loops are successively transferred in equally spaced fashion toward the forward end of the bar. The result is a chain of sausages suspended from the bar in equally spaced loops extending from the rearward portion to the forward portion of the bar.

If the bar is of great length or the spacing between loops is small, plural chains of sausages can be suspended from the same bar in like manner.

At the end of the operation for suspending the sausages from the bar, but before the beginning of a loop reaches the forward end of the transfer zone, the operator detaches the bar from the bar supporting means in preparation for a subsequent heat treatment. If removal of the bar from the supporting means is delayed, the spacing between adjacent loops will begin to grow narrower but the sausages will not be damaged by the arms because the arms part from the forward end of the transfer zone in either a gradual or rapid manner, as mentioned above.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A first embodiment of the present invention will be described with reference to FIGS. 1, 2 and 3.

Figure 1:
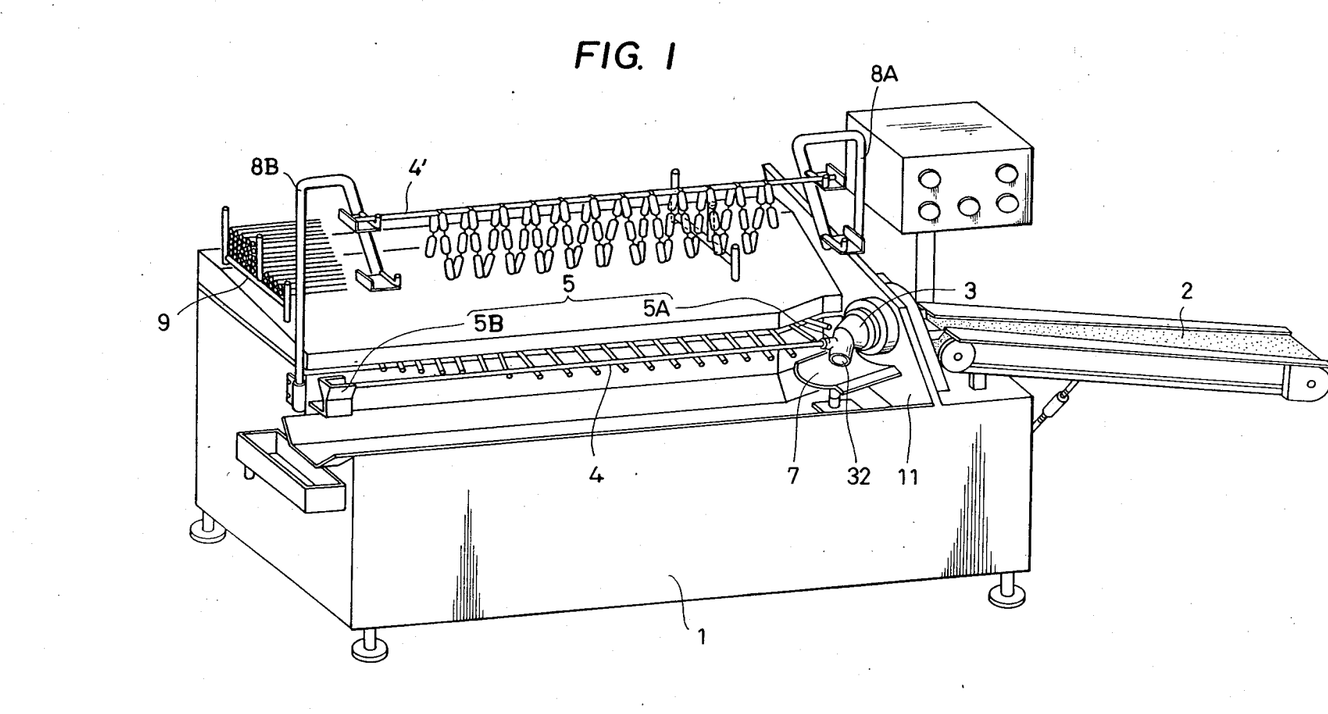
FIG. 1 is a perspective view illustrating a first embodiment of an apparatus according to the present invention.

The overall apparatus, shown in FIG. 1, includes a base 1 on the right or infeed side of which is disposed a detachable belt conveyor 2 serving as sausage feed means. The belt conveyor 2 is arranged at an incline with its left or elevated end disposed on base 1 and circulates from its lower to its elevated end. The base 1 includes a upstanding support wall 11 adjacent the elevated end of belt conveyor 2. As best seen in FIG. 2, a guide member 3 serving as loop forming means is rotatably supported by the support wall 11 via a bearing 12.

Figure 2:
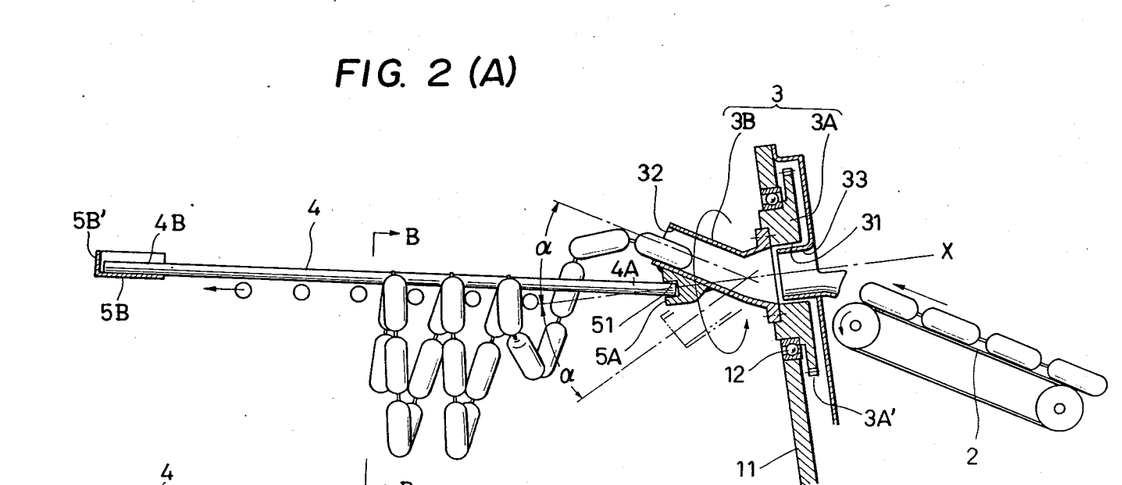
FIG. 2(A) is a longitudinal sectional view of a principal portion of the apparatus shown in FIG. 1 and illustrates the principle of the invention.
FIG. 2(B) is a view showing sausages in a suspended state as seen from the direction of the arrows B—B in FIG. 2(A)

As illustrated in FIG. 2, the guide member 3 includes a base portion 3A and a hollow cylindrical portion 3B supported by the base portion. The base portion 3A includes a centrally located sausage inlet 31 communicating with the interior of the cylindrical portion 3B. The latter has a sausage discharge port 32 at its distal end. The base portion 3A also is formed to include sprockets 3A' for being rotatively driven by drive means, described below. The cylindrical portion 3B is inclined at an angle with respect to the central axis X of the base portion 3A. Thus, the sausage discharge port 32 of cylindrical potion 3B is located off-center relative to the axis X. Accordingly, when the base portion 3A is rotated about its central axis X, the discharge port 32 describes a circle about the axis X.

In order for sausages carried in by the belt conveyor 2 to be smoothly delivered to the cylindrical portion 3B through the inlet 31, the end of a non-rotating introducing member 33 is partially inserted into the inlet 31 of base portion 3A and fixed to the support wall 11.

Fixedly secured to the exterior of cylindrical portion 3B at one point thereon is a block constituting a first support portion 5A and having a recess 51 for engagably supporting a rear portion 4A of a bar 4 on the axis X. The first support portion 5A is located in a portion of space defined by a conical surface described by the cylindrical portion 3B as it revolves about the axis X. Thus, while the bar 4 is held at a fixed position, the sausage discharge port of cylindrical portion 3B revolves about the rear portion B of the bar 4. A second support portion 5B for supporting the forward end 4B of bar 4 is fixedly attached to the base 1 and has a stopper 5B' for preventing the bar 4 from moving forward, i.e., leftward in FIGS. 1 and 2. The first and second support portions 5A, 5B constitute support means 5 (FIG. 1).

Figure 3:
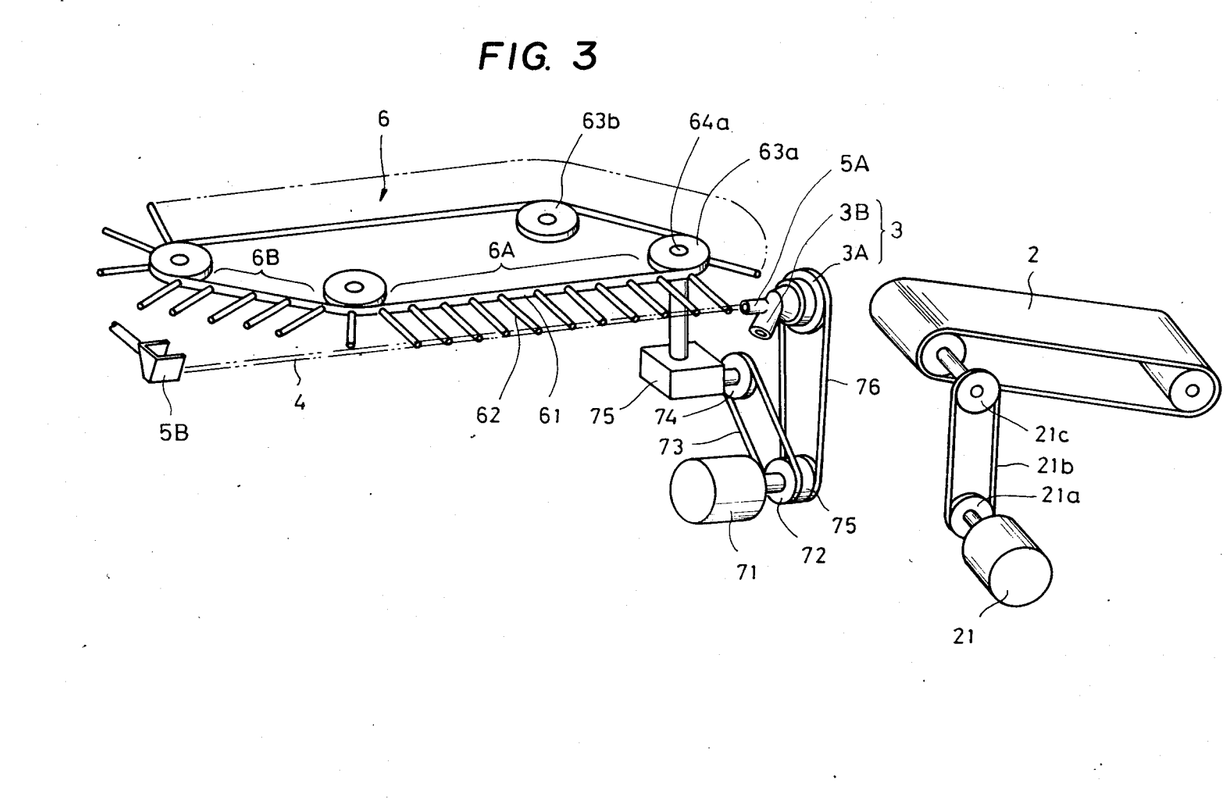
FIG. 3 is a perspective view illustrating the construction of the principle portion of FIG. 2, inclusive of drive means.

As shown in FIG. 3, transfer means 6 is provided alongside the bar 4 supported in the manner described above. The transfer means 6 comprises an endless traveling body 61 such as a chain engaging with a number of sprocket wheels 63a, 63b . . . , and a number of equidistant arms 62 attached to the traveling body 61 and projecting transversely thereof. The transfer means 6 has a transfer zone 6A spaced from the bar 4 and along which the transfer means travels from the rear portion 4A toward the forward portion 4B of rod 4. The arms 62 are so arranged as to slide along in contact with or in close proximity to the lower surface of the bar 4 in the transfer zone 6A.

The transfer means 6 has a segment 6B, immediately downstream of the transfer zone 6A, at which the arms 62 gradually depart from the bar 4. In leaving the area of the bar 4, therefore, the arms 62 will not damage the sausages suspended from the bar even if there is a delay in detaching the bar from the apparatus.

The transfer means 6 is driven by drive means of the type shown in FIG. 3. Specifically, a shaft 64a is fixedly secured to the sprocket wheel 63a, which is one of the sprocket wheels with which the traveling body of transfer means 6 is engaged. The shaft 64a is rotatively driven by a stepless transmission motor 71 via a gear body 75, sprocket wheels 72, 74 and a belt 73 engaging with and spanning the sprocket wheels 72, 74. At the same time, the stepless transmission motor 71 rotatively drives the sprocket wheel 3A' on the base portion 3A of guide body 3 via sprocket wheel 75 and chain 76 engaging the sprocket wheel 75. The number of arms 62 that travel per loop can be set by suitably setting the diameter ratios of the foregoing sprocket wheels.

The belt conveyor 2 is also driven by a stepless transmission motor 21 acting through sprocket wheels 21a, 21c and a chain 21b engaging with and spanning these sprocket wheels. The suspended length of one loop of sausages is set by changing the speed of motor 21 with respect to the stepless transmission motor 71 simultaneously driving the guide body 3 and transfer means 6.

Returning to FIG. 1, a receptacle 7 is arranged at a position underlying the sausage discharge port 32 of the guide body 3 and has a concave receiving surface facing the discharge port 32 for receiving sausages.

Hook-shaped support pillars 8A, 8B are attached to the base 1 to substantially overlie the first and second support portions 5A, 5B, respectively, of the support means 5 for temporarily pooling a bar 4' from which sausage have already been suspended in equally spaced loops. A bar stacker 9 is provided on base 1 at the back thereof for holding in standby a number of bars from which sausages will eventually be suspended.

In the operation of the above-described apparatus according to the first embodiment of the present invention, the traveling body 61 and guide body 3 are driven into operation while sausages are being fed into the guide body 3 from the belt conveyor 2. As a result, the sausages are discharged from the discharge port 32, the revolution of which about the axis X causes the emerging sausages to loop around the rear portion 4A of bar 4 and depend therefrom. The first loop of sausages thus suspended from the rear portion of the bar 4 is advanced toward the front of the apparatus, i.e., leftward in FIG. 1, by one of the arms 62 which has reached the rear portion 4A of the bar. When the next loop is similarly formed on the bar 4, the next arm 62 comes into position at the rear portion 4A. Thus, loops are shifted forwardly one after another in equally spaced relation along the bar 4 by the arms 62.

The loop suspending operation for one chain of sausages ends by the time the lead loop reaches the end of the transfer zone 6A. At such time the operator lifts the bar 4 from the support portions 5A, 5B and either carries the bar to a suitable apparatus in preparation for heat treatment or temporarily suspends the bar from the hook-shaped pillars 8A, 8B. Several of the bars may be pooled on the hook pillars 8A, 8B in this manner. Note that when the looping of one chain of sausages on the bar ends, the apparatus can be stopped and the bar lifted or, alternatively, another chain of sausages can be suspended from the bar in continuous fashion. In the latter case, the apparatus can be made to wait to make the spacing between the leading chain of sausages and the next chain the same as that of the abovementioned spacing.

Figure 4:
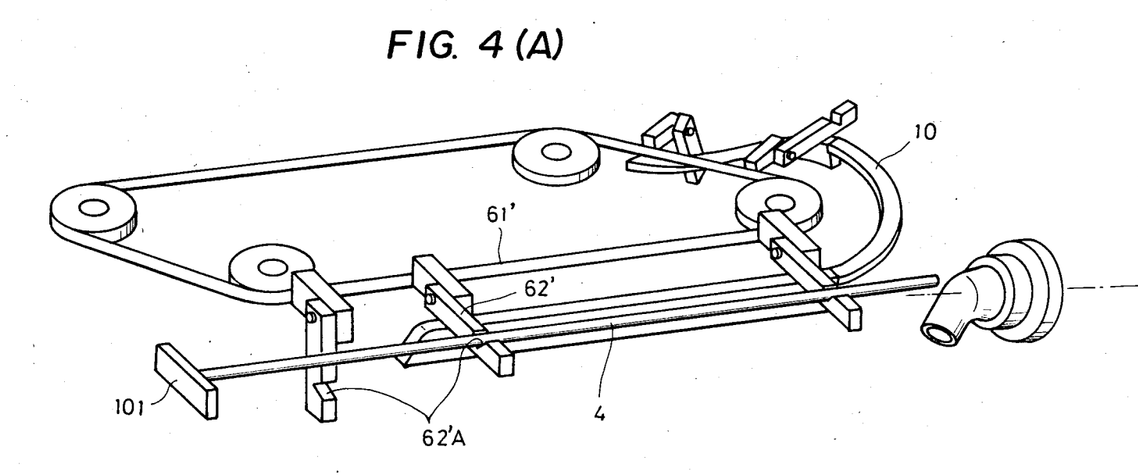
FIG. 4(A) is a perspective view illustrating the essential elements of a second embodiment of an apparatus according to the present invention.
FIG. 4(B) is a side view showing a portion of an arm included in the apparatus of FIG. 4(A)
Fig.4(C) is a side view showing a modification of the arm of FIG. 4(B)
Figure 5:
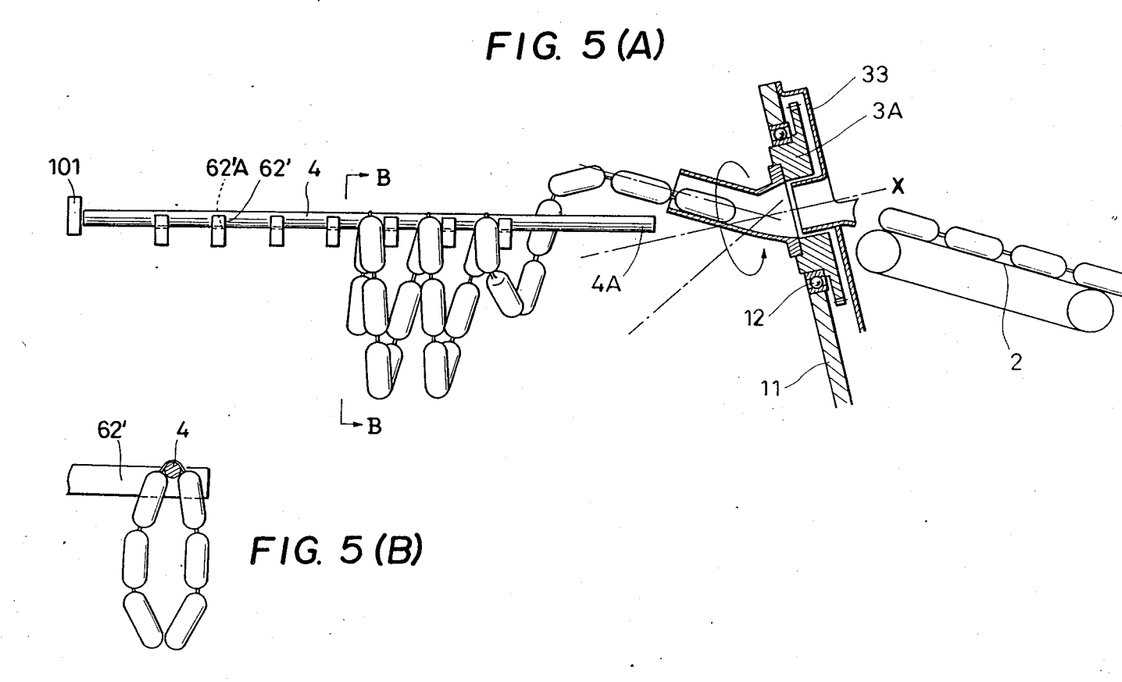
FIG. 5(A) is a longitudinal sectional view of a principal portion of the second embodiment o the apparatus and illustrates the principle thereof.
FIG. 5(B) is a view showing sausages in a suspended state as seen from the direction of the arrows B—B in FIG. 5(A)

FIGS. 4 and 5 illustrate a second embodiment of the present invention, which differs from the first embodiment in that the bar 4 is supported by the arms attached to the endless traveling body. More specifically, arms 62', which are attached to the traveling body designated at numeral 61', are arranged so as to be capable of swinging freely. Each arm 62' has an internal mechanism (not shown) employing spring means or the like by which the arm is urged so a to swing in the downward direction. A cam 10 is arranged along the traveling body 61'. The cam 10 is formed to include a portion having a gradually ascending twist at a position remote from the rearmost end of the bar 4 for engaging and swinging the arms 62' upwardly against the urging force of the aforementioned internal mechanism, a curved horizontal portion contiguous to the ascending portion and leading to the rear of the bar 4 for bringing the arms 62' to a horizontal attitude, and a horizontal portion contiguous to the curved portion and extending linearly from the rear portion of the bar 4 to a position near the forward end of the bar 4 for guiding the arms 62' along the bar 4 while in the horizontal attitude. Accordingly, as the arms 62' are circulated by the traveling means 61', each arm 62' is caused to swing downwardly away from the bar 4 in rapid fashion at the position near the forward end of the bar as the arm disengages from the cam 10, thereby parting from the loop of sausages. This arrangement widens the zone along which sausages can be suspended from the bar 4, thus allowing the bar to be utilized more effectively.

The upper edge surface of each arm 62' is formed to include a V-shaped notch 62A' serving as a portion for supporting the bar 4. The bar 4 is supported at the notch 62A' and positioned by it longitudinally of the arm 62. Supporting the bar 4 by the V-shaped notches 62A' in this manner is advantageous in that the arms 62' are allowed to contact the sausage loops at positions very close to the locations at which the loops are suspended from the bar 4.

Arranged at the forward end of the bar 4 is a stopper 101 for stopping forward movement of the bar by abutting its forward end surface.

Since the bar 4 is supported by a series of the arms 62', means for supporting the bar need not be specially provided, as in the first embodiment. In addition, the rear portion 4A of bar 4 may be freely positioned since it is not supported by the guide body. As shown in FIG. 5, the rear portion 4A may be disposed at a position other than one located on the central axis X of the base portion 3A of the guide body, or at a more leftward position in the conical space defined by the rotation ofFvH the guide body as viewed in FIG. 5.

A modification of the arms is shown in FIG. 4(C). Here the arm, designated at numeral 62'', has an inclined configuration and is formed to include a projection 62''a at its distal end for retaining and positioning the bar 4.

Figure 6A:
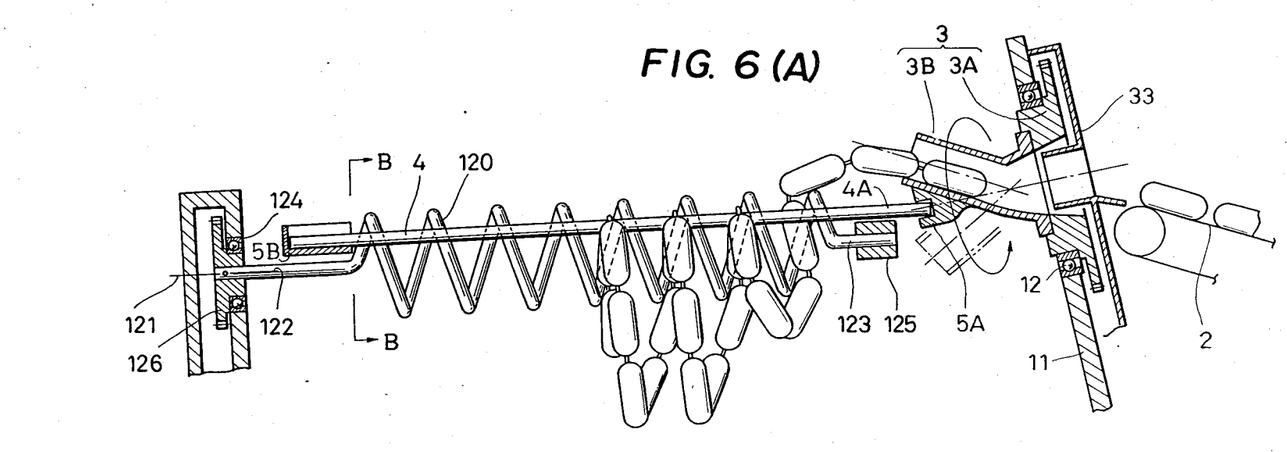
FIG. 6(A) is a longitudinal sectional view of a principal portion of a third embodiment of the apparatus and illustrates the principle thereof.

FIG. 6 illustrates a third embodiment of the invention, which differs from the first and second embodiments in that the transfer means is not adapted for movement. Specifically, as shown in FIG. 6, the transfer means includes a helical body 120 centered on an axis of rotation 121 and spaced away from the bar 4. The helical body 120 is designed to have a radius long enough to enable the helical body to engage the loops of the sausage suspended from the bar 4, and to have a helical pitch equivalent to the spacing of the arms in the transfer means of the foregoing embodiments. The spiral body 120 has end portions 122, 123 journalled by respective bearings 124, 125 on the axis of rotation 121. The end portion 122 is fixedly secured to a sprocket wheel 126 for being rotatively driven. The arrangement is such that the bar 4 and axis of rotation 121 are pitched slightly downward toward the forward end of the apparatus, i.e., leftward in FIG. 6.

In operation, the helical body 120 is rotated about the axis 121 via the sprocket wheel 126 to engage with and transfer the sausage loops toward the forward end of the apparatus without the helical body 120 itself advancing. Accordingly, the advantages of the third embodiment are that little space is required for the transfer means and the mechanism thereof is very simple.

It should be noted that if the helical body 120 is tapered toward its forward end, i.e., such that the loops of the helix grow successively smaller in diameter from a predetermined point along the helical body toward the front end thereof, the effects obtained are the same as those provided by the segment 6B (FIG. 3) of the transfer means 6 in the first embodiment of the invention. Rather than tapering the helical body 120 in this manner, an alternative approach would be to adopt an arrangement in which the entirety of the helical body 120 separates from the bar 4 when the sausages are finished being hung from the bar.

Figure 6B:
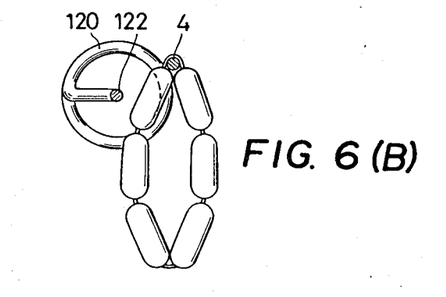
FIG. 6(B) is a view showing sausages in a suspended state as seen from the direction of the arrows B—B in FIG. 6(A)

As shown in FIG. 6(B), the helical body 120 is provided on only one side of the bar 4. However, helical bodies can be situated on both sides of bar 4 to transfer the sausages while applying equal forces from both sides.

It is also possible to adopt a helical body capable of being extended and contracted freely in the axial direction so that the helical pitch can be selected at will.

Figure 7:
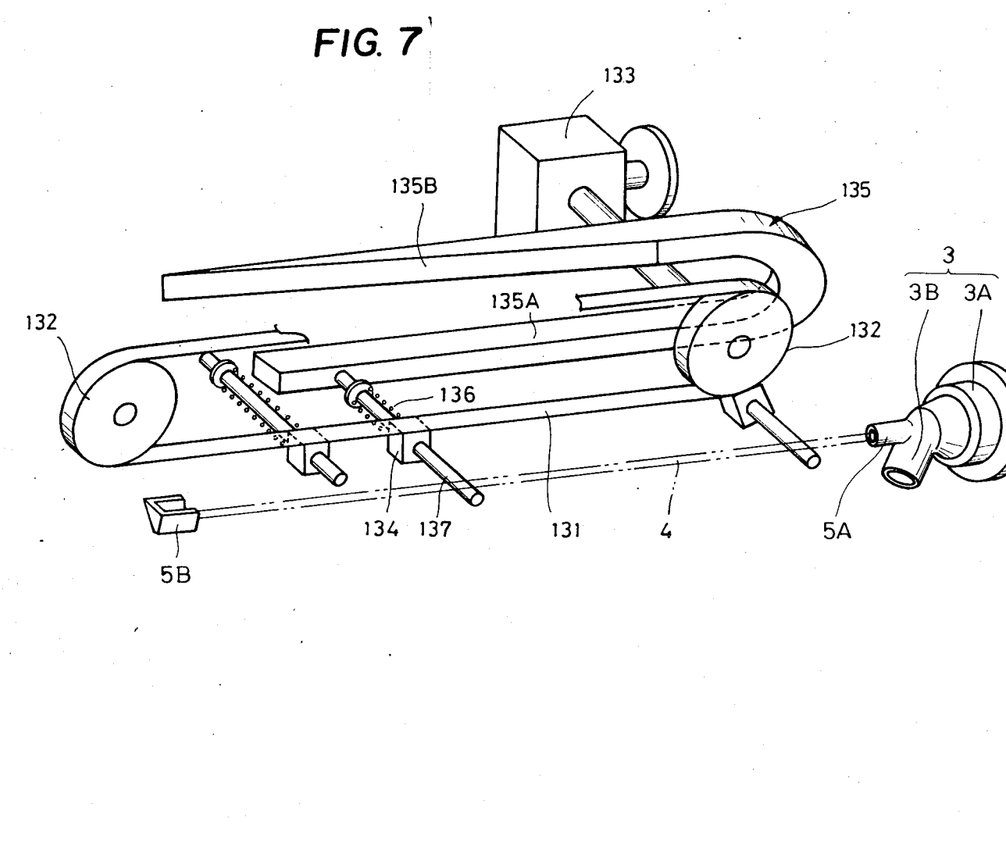
FIG. 7 is a perspective view illustrating the essential element of a fourth embodiment of an apparatus according to the present invention.

A fourth embodiment of the present invention is illustrated in FIG. 7. This embodiment is characterized in that the endless traveling body travels in plane at right angles to the arms, and in that the arms are withdrawn rapidly away from the bar in the axial direction a the forward end portion of the bar.

A chain 131 engages with and spans sprocket wheels 132 driven by a gear box 133. The plane in which the chain travels lies perpendicular to arms 137 guided slidably through blocks 134 attached to the chain 131. The side of each arm 137 at the tip thereof contacts the lower side of the bar 4, and the end face of each arm 137 at the end opposite the tip is brought into resilient contact with the side face of a cam 135 by a spring 136. The cam 135 has a linear portion 135A which lies parallel to the bar 4 in the transfer zone and which terminates at a position close to the forward end of the bar 4, and a portion 135B contiguous to and overlying the linear portion 135A, the portion 135B gradually tapering toward the forward or left end of the apparatus along the length of the bar 4.

According to this embodiment of the present invention, the circulating arms 137 are projected from the blocks 134 towards the bar 4 at the linear portion 135A of cam 135 in the transfer zone at a position slightly below the bar 4 supported at both ends by the first support portion 5A and second support portion 5B. When each arm 137 reaches the end of the transfer zone, namely the tip of the linear portion 135A of the cam 135, the arm 137 is freed from the cam 135 and is caused to withdraw into the block 134 away from the bar 4 by the action of the spring 136. The design is such that each arm 137 is not withdrawn more than a prescribed distance. Thereafter, the arm 137 is restored to its projecting position by the tapered portion 135B of cam 135 at a timing which will not allow the arm 137 to strike the bar 4, and the arm is subsequently returned to the starting point of the linear portion 135A.

The fourth embodiment of FIG. 7 requires less space, particularly a smaller floor area, for the transfer means in comparison with the first and second embodiments. It also makes it possible to withdraw the arms 137 away from the bar 4 rapidly and enables the bar 4 to be utilized effectively, as in the second embodiment.

According to the present invention, a chain of sausages fed in from supply means is automatically suspended directly from a bar in. equally spaced loops. This greatly improves the efficiency at which the sausages can be suspended from the bar in preparation for a subsequent heat treatment.

If a link forming conveyance apparatus of a sausage stuffing machine is connected to the apparatus of the invention to serve as the supply means, the process steps from sausage stuffing to suspension of the sausages from the bar can be fully automated. Further, though the prior-art systems may possess a stuffing machine having a high capability, the fact that manual operations are demanded by the sausage suspending apparatus does not allow the stuffing machine capability to be fully exploited. The result is a system having a low efficiency overall. With the apparatus of the present invention, however, the efficiency of the sausage suspending operation is greatly improved, thus making it possible to raise overall efficiency by enabling full and efficient utilization of a stuffing machine connected thereto.

As many apparently widely different embodiments of the present invention can be made without departing from the spirit and scope thereof, it is to be understood that the invention is not limited to the specific embodiments thereof except as defined in the appended claims.

What is claimed is:

1. A method of suspending a chain of linked sausages in loops from a bar or smoke stick, said bar having a rearward portion and a forward portion comprising the steps of:

continuously discharging the chain of linked sausages while forming the chain into loops of sausages at a particular location;

positioning said bar on support members adjacent to said location with said bar being stationary at least in its axial direction from said rearward to said forward portion;

suspending said loops of sausages at said rearward portion of said bar, the rearward portion of said bar being situated inside the loops;

applying a pushing force to each loop for successively moving each loop suspended from the bar toward the forward portion of the bar while maintaining a spacing between mutually adjacent one's of the loops; and removing said bar from said support members with said loops suspended therefrom after finishing said suspension of sausages.

2. A method as claimed in claim 1, wherein said spacing between mutually adjacent loops in equal.

3. A method as claimed in claim 1 wherein said spacing between mutually adjacent loops is of a predetermined distance.

4. An apparatus for suspending a chain of linked sausages in loops from a bar that is a smoke stick, said bar having a rearward portion and a forward portion, comprising:

loop forming means including a guide body having an inlet port at one end thereof for receiving said chain of linked sausages, and a discharge port at the other end thereof for discharging said chain of sausages while said discharge port is being revolved to form said chain of sausages into loops, said chain of sausages being suspended by said loop forming means in loops from the rearward portion of the bar, said guide body being supported for rotation about the central axis of said inlet port and said discharge port being off center with respect to said central axis;

bar supporting means for detachably supporting said bar to be stationary at least in its axial direction from said rearward to said forward portion and having a support portion for supporting said bar with the rearward portion of the bar disposed inside the loops into which said chain of sausages is formed; and transfer means for successively moving each loop suspended from said bar toward the forward portion of the bar while maintaining a spacing between mutually adjacent ones of said loops.

5. The apparatus according to claim 4, wherein said transfer means includes an endless traveling body having a transfer zone extending from the rearward portion toward the forward portion of the bar and spaced away from the bar, said endless traveling body having a plurality of arms attached thereto for contacting and moving the loops of sausages suspended from the bar, said arms having a spacing equivalent to the spacing of said loops.

6. The apparatus according to claim 4, wherein said transfer means comprises a helical body which rotates about an axis spaced away from the bar.

7. An apparatus as claimed in claim 5, wherein each said arm retracts in its longitudinal direction to separate from said bar at the forward portion of said bar, each said arm being subsequently returned by said endless traveling body to a position at the rearward portion of said bar in its extending position for transfer of said loops.

8. The apparatus according to claim 6, wherein the support portion of said bar supporting means comprises a first support portion for supporting the rearward portion of the bar on a rotational axis of the guide body, and a second support portion for supporting the forward portion of the bar.

9. The apparatus according to claim 8, wherein the first support portion is a recessed portion formed in a part of the guide body, and the second support portion is a receiving member on which the forward portion of the bar is placed.

10. The apparatus according to claim 5, wherein said bar supporting means comprises a bar supporting portion provided on each arm of said transfer means for positioning the bar longitudinally of the arm and for supporting the bar, and a stopper for stopping movement of the bar toward the forward portion of the bar.

11. The apparatus according to claim 5, wherein each of said arms is beneath the lower side of the bar at least in the transfer zone of said transfer means.

12. The apparatus according to claim 5 or claim 11, wherein said transfer means has means for gradually separating the arms from the bar as the endless traveling body travels by the forward portion of the bar.

13. The apparatus according to any one of claims 5, 10 and 11, wherein each of the arms of said transfer means swings downwardly at the forward portion of the bar and is subsequently returned to a position at the rearward portion of the bar, by which time the arm is restored to an attitude in which it is beneath the lower surface of the bar.

14. An apparatus is claimed in claims 5, 10 or 11, wherein each of said arms is pivotably mounted for swinging downwardly after passing said transfer zone, and said transfer means further including means to position said arms to support said bar from beneath in said transfer zone.

15. The apparatus according to claim 4, further comprising a non-rotational introducing member for guidably introducing the chain of sausages into the inlet port, said introducing member penetrating the interior of said inlet port.

16. The apparatus according to claim 4, wherein a receptacle is disposed at a position underlying the discharge port and has a receiving surface facing the discharge port for receiving sausages.

17. An apparatus as claimed in claim 4 wherein said spacing between mutually adjacent loops is equal.

18. An apparatus as claimed in claim 4 wherein said spacing between mutually adjacent loops is of a predetermined distance.

19. An apparatus as claimed in claim 4, wherein said support portion for supporting said bar at said rearward portion is positioned on the rotational axis of said guide body, said forward portion of the bar being supported separately from said rearward portion of the bar.

20. An apparatus for suspending a chain of linked sausages in loops from a bar or smoke stick, said bar having a rearward portion and a forward portion, comprising:

loop forming means for receiving said chain of linked sausages and for forming said chain of sausages into loops, said chain of sausages being suspended by said loop forming means in successive loops from the rearward portion of the bar;

bar supporting means for detachably supporting said bar to be stationary at least in the axial direction from said rearward to said forward portion and having a support portion for supporting said bar with the rearward portion of the bar disposed inside the loops into which said chain of sausages is formed; and transfer means for successively moving each loop suspended from said bar toward the forward portion of the bar while maintaining a spacing between mutually adjacent ones of said loops.

21. An apparatus for suspending a chain of linked sausages from a bar or smoke stick, in loops, said bar having a rearward portion and a forward portion, comprising:

loop forming means having an inlet port at one end thereof for receiving the chain of linked sausages, and a discharge port at another end thereof for discharging the sausages while said loops forming means is rotated to form the chain of sausages into loops, said chain of sausages being suspended in loops from the rearward portion of the bar;

support and transfer means for detachably supporting the bar to be stationary at least in its axial direction from said rearward to said forward portion with the rearward portion of said bar being disposed inside the loops into which said chain of sausages is formed, and for successively moving each loop suspended from said bar toward a forward portion of said bar while maintaining spacing between mutually adjacent ones of the loops, said support and transfer means including an endless traveling body having a transfer zone extending from the rearward portion toward the forward portion of said bar, said endless traveling body having a plurality of arms attached thereto for supporting said bar from the underside thereof and for contacting and moving said loops of sausages suspending from said bar toward said forward portion of said bar.

* * * * *